Jan. 9, 1968  G. A. VAUGHN  3,363,048
CABLE SUPPORTING TRAY
Filed Oct. 18, 1965  3 Sheets-Sheet 1

INVENTOR
GEORGE A. VAUGHN
BY
Lawrence Rosen
ATTORNEY.

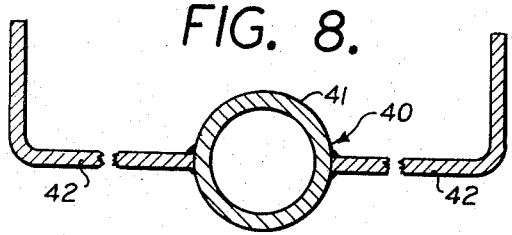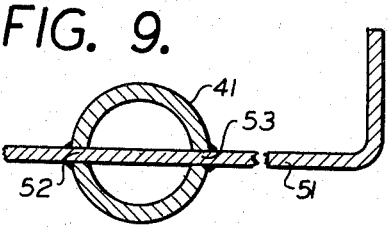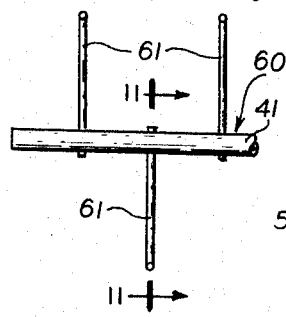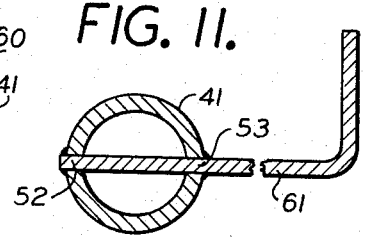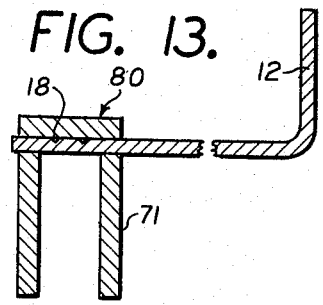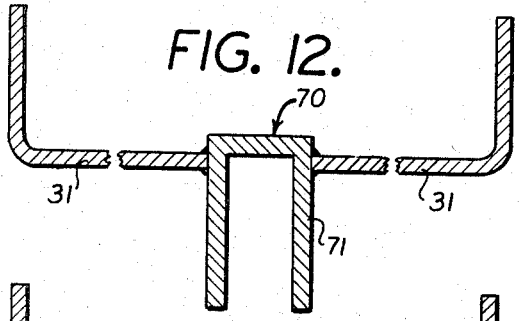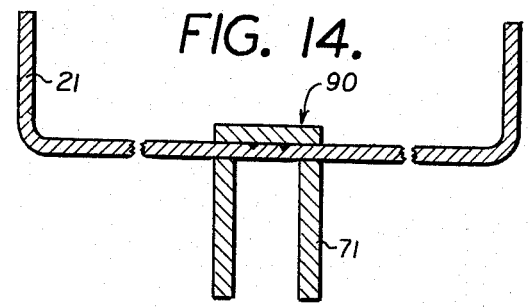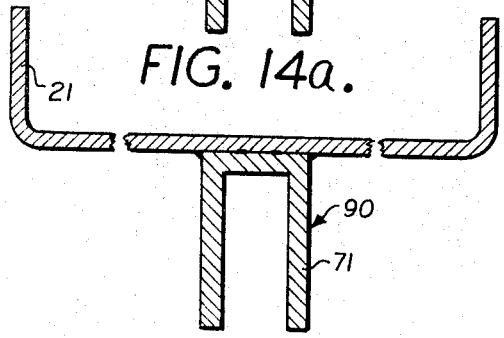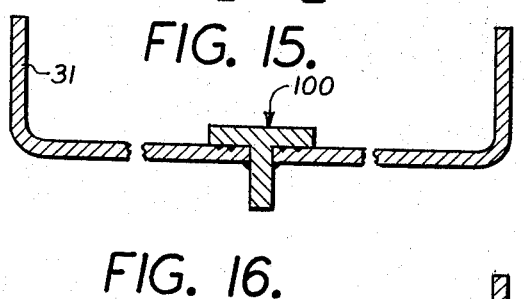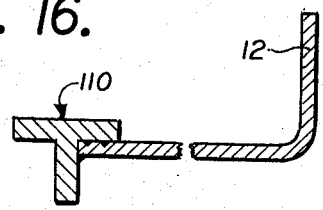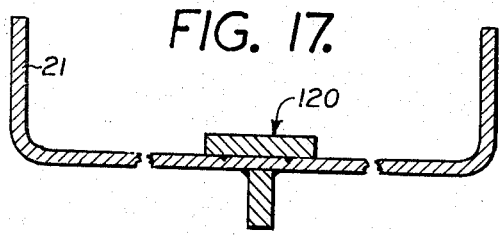

Jan. 9, 1968   G. A. VAUGHN   3,363,048
CABLE SUPPORTING TRAY
Filed Oct. 18, 1965   3 Sheets-Sheet 3

INVENTOR
GEORGE A. VAUGHN
BY Lawrence Rosen
ATTORNEY.

United States Patent Office 3,363,048
Patented Jan. 9, 1968

3,363,048
CABLE SUPPORTING TRAY
George A. Vaughn, Princeton, N.J., assignor to Mono-Systems, Inc., Jamaica, N.Y., a corporation of New York
Filed Oct. 18, 1965, Ser. No. 497,267
6 Claims. (Cl. 174—72)

ABSTRACT OF THE DISCLOSURE

Supporting apparatus for electrical cables and the like made of lightweight metals comprising a narrow elongated rigid spine member and a plurality of parallel projecting fingers rigidly mounted upon and extending from the spine member to define an essentially tray-shaped configuration which supports said electrical cables and the like as well as permitting the free circulation of air. The ends of the spine members contain means for joining adjacent lengths of said spine members to each other. The connecting means may also be provided with an anchoring device for hanging said supporting apparatus.

This invention relates to supporting members for cables, pipes, bus bars, lighting fixtures, conduits or other conductors; and more particularly, to an improved cable supporting tray of sturdy, lightweight construction capable of supporting varying weights.

Tray-shaped supports for cables and conduits are widely known in industry. These are generally utilized in the installation of cables and conduits during the construction of buildings or other edifices, telephone exchanges, electric generating plants, and others. Basically, the principal functions of cable supports or trays lie in providing support for the cables over varying distances, horizontally, vertically, and in all other directions; maintain the cables in their place; permit cooling air to circulate about them; and great accessability to the cables, etc.

Among well known cable supports or trays are those of the trough, basket, channel or ladder types. These usually consist of integrally stamped or assembled sheet metal sections having a bottom or floor portion which is supported between two upstanding continuous flange sides, thus forming a tray-shaped or channel configuration. The bottom portion of one type of tray, on which the conductors or cables lie, may be solid sheet metal formed at its edges into upstanding flanges. Another type of cable tray has openings or slots punched into the bottom surface supporting the cable, whereby the surrounding air will circulate through the slots and aid in cooling the conductors, which may be hot as a result of electrical currents passing therethrough. Still other cable trays known in the art provide for parallel spaced flanges interconnected by spaced sheet metal strips forming a bottom surface on which the conduits are supported.

Frequently, many installations which utilize the aforedescribed cable trays require changes in direction, either horizontally or vertically, of the conduits or cables. Since it is necessary that the cables be supported throughout such directional changes, fittings are provided intermediate to adjacent cable trays, which will facilitate the junction of the latter at various angles. These fittings, which in essence are special forms and configurations of the cable trays, take the shape of elbows, crosses, T's, Y's or risers, etc.

Although the aforedescribed cable trays and fittings are widely known and used in industry, various problems have been encountered in their manufacture and use. A major problem prevalent in the prior art cable trays is that they require two splice plates for the flange sides and at least two hangers for their trapeze-type suspension or support. Another drawback lies in that all of the known cable trays and fittings are expensive inasmuch as their particular construction requires the use and maintenance of complex and costly manufacturing equipment. Furthermore, special tools, jigs, etc. are required for field alterations.

The cable supporting tray according to this invention overcomes the foregoing and other problems encountered in the prior art by providing a novel and improved tray-shaped cable supporting member comprised of inexpensive and efficient lightweight metal components. In essence, the present invention provides for a tray-shaped cable supporting structure or member having a rigid central spine constituted of an elongated channel section, preferably of an extruded metal, such as aluminum, steel or the like. Although the use of aluminum is especially preferred because of its light weight and strength, it will be understood that other metals as well as plastics may also be effectively employed. A plurality of parallel, spaced rods or fingers of similar metallic composition are fastened to the metal channel or spine so as to project therefrom on opposite sides thereof in the longitudinal transverse plane. The free outer or distal ends of the rods or fingers are bent upward relative to the transverse plane of the central spine, forming upturned flange-like projections, as a result of which the structure achieves substantially tray-shaped configuration. Spine members of any cross section may be employed.

A feature of the present invention is that the provision of a central spine and radially projecting cable supporting fingers results in a cable tray of extremely sturdy and lightweight construction affording maximum access of circulating cooling air to the cables supported thereon thereby upgrading the current carrying capacity of the cable. Another feature of the cable tray construction according to the present invention is that the cable carrying capacity thereof may be varied without appreciable modification of the basic structure, since only the lengths of the rods or fingers need be changed in order to affect correspondingly the effective width and/or height of the cable tray.

It will also become readily apparent that the cable tray construction according to this invention eliminates the need for the reducer and expansion sections and connectors required with the cable trays of the prior art. By simply cutting the end extremities of any number of channel sections or spines at predetermined angles and then joining them with other similar segments, curved tray constructions, in both horizontal or vertical directions, may be easily obtained. In a similar manner, by joining channel segments at right or other appropriate angles to each other, crosses, T's, or Y's, are also conveniently and simply manufactured. The present invention also contemplates one simple and efficient connector for adjacent straight-run sections, curved sections, etc. of cable tray supporting members, which is insertable into the latter and concurrently therewith is adaptable as an anchoring device for a cable tray hanger support structure.

An advantage of the cable supporting tray according to this invention is that it provides a simple lightweight structure, easily assembled and inexpensive to manufacture.

Accordingly, it is an object of the present invention to provide a cable supporting tray of an extremely lightweight and efficient construction.

Another object of the present invention is to provide a cable supporting tray affording improved cooling air circulation to the conductors carried thereon.

Still another object of the present invention is to provide an improved cable supporting tray construction having a rigid central spine and a series of spaced cable supporting fingers fastened thereto in radially extending cantilevered positions.

A still further object of the present invention is to provide a cable supporting tray adapted to be converted into fittings or transition sections in a simple and expedient manner of manufacture.

The manner in which these and other objects and advantages of this invention will be obtained will become apparent from the following detailed description and drawings, in which:

FIG. 7b is a modification of the embodiment shown in FIG. 7a;

FIG. 8 is an enlarged sectional view on line 8—8 of FIG. 7a;

FIG. 9 is an enlarged sectional view on line 9—9 of FIG. 7b;

FIG. 10 is a view similar to that of FIG. 1, illustrating a sixth embodiment of the cable supporting tray;

FIG. 11 is an enlarged sectional view on line 11—11 of FIG. 10;

FIGS. 12 through 17 are cross-sectional views of further embodiments of the cable supporting tray;

Figure 1:
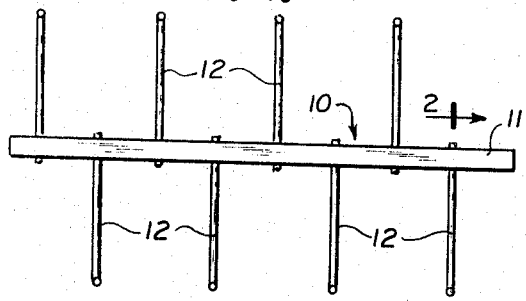
FIG. 1 is a plan view of one embodiment of the cable supporting tray according to this invention.
Figure 2:
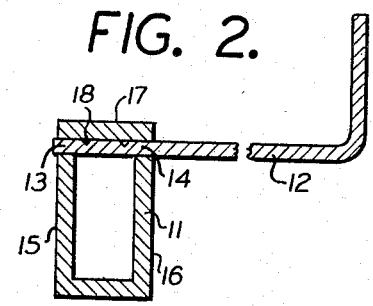
FIG. 2 is an enlarged sectional view on line 2—2 of FIG. 1.

Referring now in particular to the drawings, FIGS. 1 and 2 show a cable supporting tray 10 which has an elongated spine or channel 11. The spine 11 is formed from an extruded or rolled metal, such as aluminum or steel, having in cross-section the shape of a rectangular box-like channel. Fingers or rods 12 of essentially circular cross-sectional configuration extend through apertures 13 and 14 in the sidewalls 15 and 16 of channel 11. The end of fingers 12 which are remote from the channel 11 are bent upwards at substantially right angles relative to the remaining portion of the fingers 12 and the upper wall 17 of channel 11. Apertures 13 and 14 are positioned so that the portion of the fingers 11 extends through the interior of channel 11 in contact with the lower surface of channel upper wall 17. Suitable indentations 18 in the upper surface of channel wall 17 may be provided by peening or other methods known in the art to cause a flow of material at the lower surface thereof into binding engagement with fingers 12 adjacent thereto and preventing movement of the latter relative to the channel 11.

Since the fingers 12 protrude from the side walls 15 and 16 of channel 11 in alternating opposite directions throughout the longitudinal length of the channel, a traylike effect is obtained wherein support is provided for cables or conductors placed on the fingers 12 coextensive with the length of channel 11.

Figure 3:
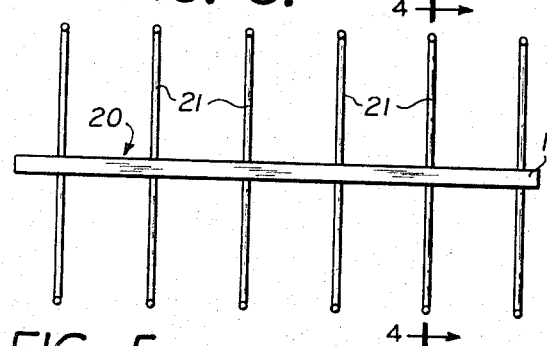
FIG. 3 is a view similar to that of FIG. 1, illustrating a second embodiment of the cable supporting tray.
Figure 4:
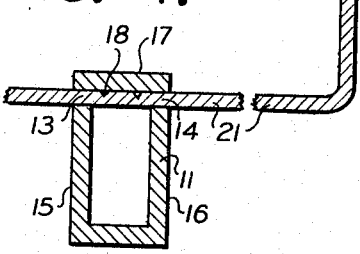
FIG. 4 is an enlarged sectional view on line 4—4 of FIG. 3.

In FIGS. 3 and 4, cable supporting tray 20 is similar to that illustrated in FIG. 1 in that it has a central spine or channel 11. (Throughout the specification all identical parts and components are accorded identical reference designations.) Apertures 13 and 14 are provided through sidewalls 15 and 16 of channel 11, and are adapted to receive fingers 21 passing therethrough. Fingers 21 are essentially similar to fingers 12 in cross-sectional form; however, fingers 21 extend from both sides of channel 11 and are bent upwards at both ends to form the traylike configuration of cable supporting tray 20. The fingers 21 may be fastened to channel 11 in a manner quite similar to that utilized for fingers 12. In this embodiment the projections of fingers 21 from channel 11 are coextensive on both sides of the channel, as compared to the staggered projections of fingers 12.

Figure 5:
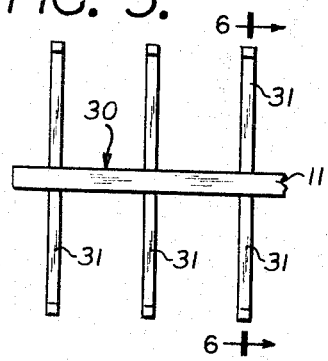
FIG. 5 is a view similar to that of FIG. 1, illustrating a third embodiment of the cable supporting tray.
Figure 6:
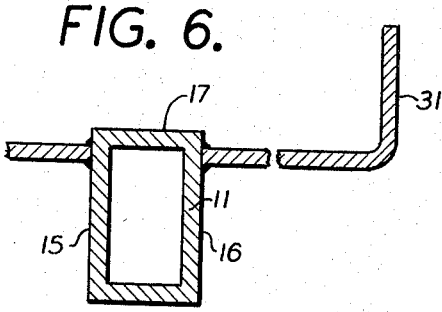
FIG. 6 is an enlarged sectional view on line 6—6 of FIG. 5.

Illustrated in FIGS. 5 and 6 is a modified cable supporting tray 30 having a central spine or channel 11 similar to the previous embodiments. However, in this instance, the apertures 13 and 14 have been omitted in the sidewalls 15 and 16 of channel 11. Fingers or rods 31 of substantially square cross-sectional configuration are attached to sidewalls 15 and 16 by suitable means, as for example, welding or brazing. The free ends of the fingers 31 are bent upwards to impart the desired tray-like configuration to the assembled components. As shown, the fingers 31 extend transversely of the longitudinal plane of channel 11 in directions substantially identical to those of fingers 12 and 21 of the aforedescribed embodiments.

Although as described herein, fingers 12 and 21 are of circular cross-section and fingers 31 of square cross-section, this is to be construed only as illustrative and not in a limiting sense, since many and varied cross-sectional configurations, i.e. circular, square, rectangular, hexagonal, octagonal, etc., may be used and substituted for each other with equal advantage.

Figure 7A:
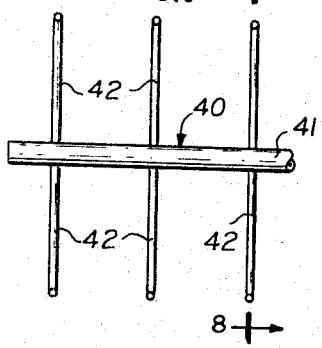
FIG. 7a is a view similar to that of FIG. 1, illustrating a fourth embodiment of the cable supporting tray.

The embodiment of cable supporting tray 40 shown in FIGS. 7a and 8 has a central spine 41 of generally tubular cross-section. Fingers 42 are brazed, welded or fastened in a known manner to the periphery of spine 41 and extend radially outward in opposite directions at an angular displacement of about 180°. The free or distal ends of the fingers are bent upwards to define the unique and novel tray-like configuration of the present invention.

Figure 7B:
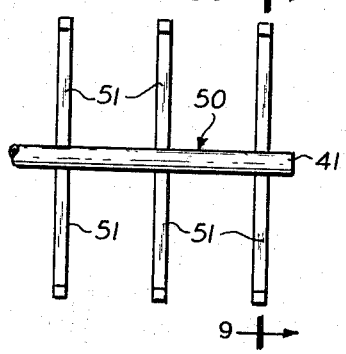

Similar to the embodiment of FIG. 7a, the embodiments of FIG. 7b and FIG. 10, illustrate cable supporting trays 50 and 60 respectively, both of which have the tubular central spine 41. However, in the embodiment of FIG. 7b, fingers 51 extend through apertures 52 and 53 in spine 41. Fingers 51 are bent upwards at both ends on either side of the spine 41 to thereby form the tray-like shape of the present invention.

The embodiment of cable supporting tray 60 is quite similar to that of tray 50, with the only distinction being that each of the fingers 61 projects radially outwardly of apertures 52 and 53 in spine 41 toward one side only and is bent upwards at its free end. As in the embodiment of FIG. 1, the fingers 61 are staggered alternately on opposite sides of spine 41 along its length so as to form a tray-like shape.

Although in the aforedescribed embodiments the fingers 42 and 61 are shown constituted of circular bar stock, and the fingers 51 of square bar stock, these shapes are illustrative only and are readily interchangeable or variable with other shapes.

Respecting cable supporting trays 70, 80 and 90 illustrated in FIGS. 12, 13 and 14 of the drawings, these are in all essential respects identical to the embodiments of the cable supporting trays of FIGS. 6, 2 and 4, respectively, with the only modification being the substitution of an inverted U-shaped open channel 71 for channel 11.

FIG. 14a shows a cable supporting tray quite similar to that shown in FIG. 14 with the major distinction being that the fingers 21 in the former are supported atop channel 71 rather than being passed through apertures 13 and 14.

Similarly, FIGS. 15, 16 and 17 show cable supporting trays 100, 110 and 120 to be substantially identical to the aforedescribed embodiments of FIGS. 12, 13 and 14, with the inverted U-shaped channel 71 being replaced by a standard T-shaped channel 101. This in effect will provide even lighter structures than the previous embodiments and is of particular advantage when relatively light or moderate conduit loadings are imposed on the trays.

Figure 18:
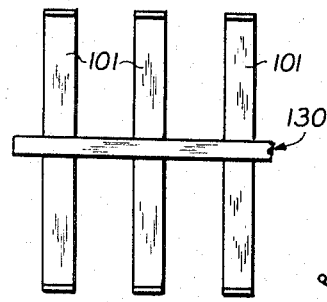
FIG. 18 is a plan view similar to that of FIG. 1, illustrating another embodiment of the cable supporting tray.

In FIG. 18 of the drawings, the central spine, which may be any one of those of the foregoing embodiments, has protruding fingers 101 of substantially flat rectangular sheet metal or aluminum stock extending from both sides to form tray 130. This particular finger construction is particularly useful when unusually heavy conduit loads are to be carried by the tray.

Figure 19:
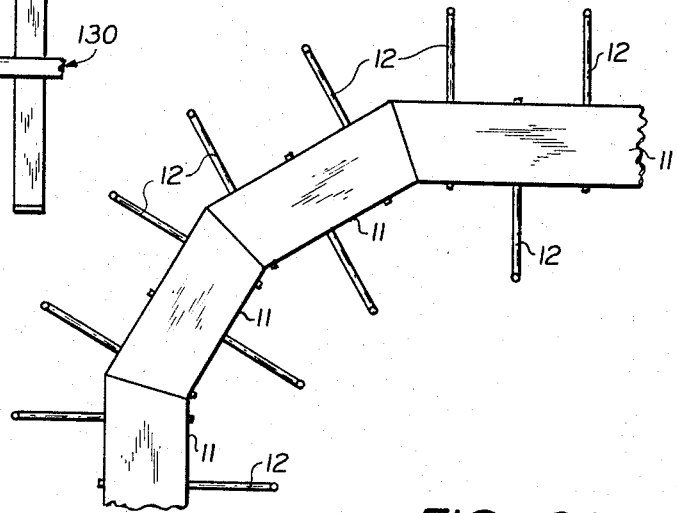
FIG. 19 is a plan view of segments of the cable supporting tray of FIG. 1 joined to form an elbow section.

Illustrative of the application of the present invention to the construction of fittings is that of FIG. 19. An elbow is formed by joining, through welding or brazing; etc. a plurality of channel segments 11, the ends of which have been cut at predetermined angles. Also they may be formed from one continuous piece bent to the desired shape. This, in effect, will facilitate changes of direction of the conductor being carried by the trays. It becomes readily apparent to one skilled in the art that it is relatively simple to join various segments of the channels of each of the foregoing embodiments so as to form all types of fittings, as for example, vertical and horizontal Y's, T's, crosses and elbows.

Figure 20:
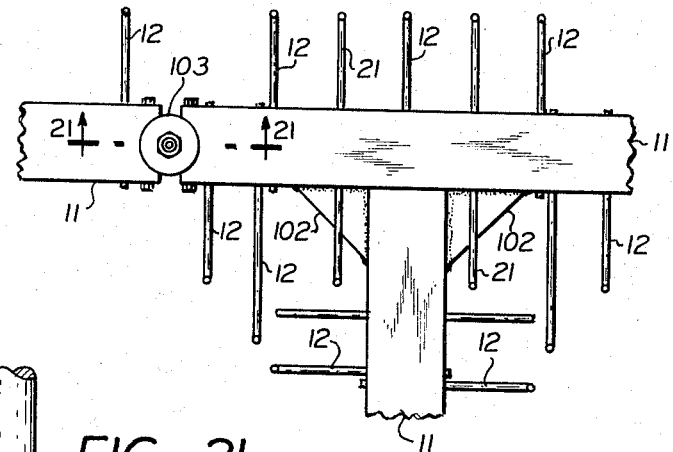
FIG. 20 is a plan view of segments of the cable supporting tray of FIG. 1 joined to form a T-connector.

A typical horizontal T and tray connection is shown in FIG. 20 of the drawings. Two channels 11 are joined together into a standard horizontal T. If required, gussets 102 may be used to provide added support and rigidity to the joint. Adjacent channels 11 which are to be connected in a straight run are joined by means of a channel member (splice plate) 103 adapted to be inserted into the ends of each of the channels 11. The channels 11 may then be fastened to channel member 103 by using the usual type of bolt-and-nut or riveted assembly placed in apertures 104 extending horizontally through the channels 11 and channel member 103.

Figure 21:
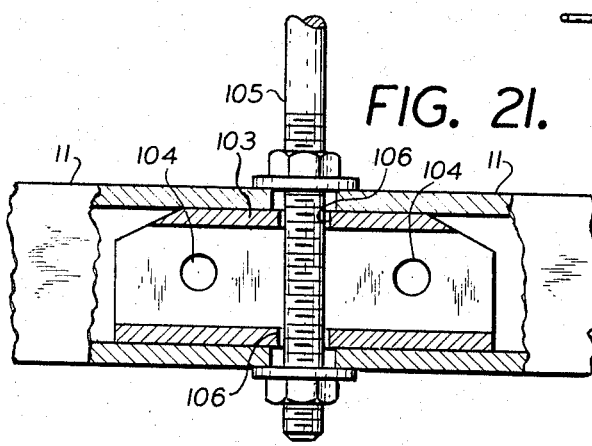
FIG. 21 is an enlarged sectional view on line 21—21 of FIG. 20 illustrating a cable supporting tray connector and a tray hanger support.

When it is desired to support the entire cable supporting tray assembly from an overhead or ceiling support, a hanger rod unit 105 may be positioned through vertically aligned apertures 106 in channel member 103. The usual type of washer-locknut assembly unit may then be used to fasten the hanger rod unit 105 to channel member 103 or supported through channel member 11 directly as shown in FIG. 21.

From the foregoing it may thus be easily ascertained that the present invention provides for improved cable supporting tray constructions of simple and inexpensive construction and superior operating characteristics.

While particular embodiments of this invention are shown above, it will be understood that the invention is obviously subject to variations and modifications without departing from its basic concept of a cable supporting structure comprising a rigid central spine provided with a plurality of spaced apart, parallel rods or fingers disposed in such a manner that a substantially tray-shaped configuration is achieved.

What is claimed is:

1. In combination, a bundle of electrical cables and lightweight apparatus for supporting said bundle of electrical cables, said apparatus consisting of a relatively narrow elongated generally rigid spine member comprising a channel hollow cross-sectional form, a plurality of parallel spaced oppositely projecting fingers rigidly mounted upon and extending from said spine member in the longitudinally transverse plane thereof, the free ends of each of said fingers being bent upward relative to said transverse plane whereby said supporting apparatus defines an essentially tray-shaped configuration supporting said bundle of electrical cables and permitting air to circulate freely about said electrical cables, and wherein each end of the spine member contains connecting means for joining adjacent lengths of said spine members to each other, said connecting means comprising a channel member of substantially complementary configuration to fit in sliding relationship into the interior end portions of adjacent spine members, and means fastening said adjacent channels and last said channel member to form an integral unit.

2. The supporting apparatus of claim 1 wherein said channel is of generally rectangular form .

3. The supporting apparatus of claim 1 including a hanger rod for suspending apparatus from building structure, said channel member being provided with a vertically disposed centrally located aperture along the longitudinal axis thereof within which said hanger rod is received.

4. A lightweight supporting device for a bundle of electrical cables, said apparatus consisting of a relatively narrow elongated generally rigid spine member comprising a channel of hollow cross-sectional form, a plurality of parallel spaced projecting fingers rigidly mounted upon and extending from said spine member in the longitudinally transverse plane thereof, the free ends of each of said fingers being bent upward relative to said transverse plane whereby said supporting device defines an essentially tray-shaped configuration to support a plurality of electrical cables and to permit air to circulate freely about said electrical cables, and wherein each end of the spine member contains connecting means for joining adjacent lengths of said spine members to each other, said connecting means comprising a channel member of complementary configuration dimensioned to fit in sliding relationship into the interior end portions of adjacent spine members, and means fastening said adjacent channels and last said channel member to form an integral unit.

5. The supporting device of claim 4 wherein said channel is of generally rectangular form.

6. The supporting device of claim 4 including a hanger rod for suspending said device from building structures, said channel member being provided with a vertically disposed centrally located aperture along the longitudinal axis thereof within which said hanger rod is received.

References Cited

UNITED STATES PATENTS

| 1,345,514 | 6/1920 | Lessells | 248—68 |
| 1,790,798 | 2/1931 | Davis | 211—182 |
| 2,117,285 | 5/1938 | Bitzer | 211—123 X |
| 2,147,878 | 2/1939 | Burgmeister | 287—2 |
| 2,474,436 | 6/1949 | Pestyner | 211—123 X |
| 3,024,301 | 3/1962 | Walch | 174—72 |
| 3,082,984 | 3/1963 | Larsson et al. | 174—72 X |
| 3,137,921 | 6/1964 | Hillberg | 248—68 X |
| 3,164,397 | 1/1965 | Kilmer | 287—2 X |
| 3,197,033 | 7/1965 | Brennan | 211—123 |
| 3,243,051 | 3/1966 | Ruhnke | 211—182 |

FOREIGN PATENTS

Add. 36,879   5/1930   France.

ROY D. FRAZIER, *Primary Examiner.*

CHANCELLOR E. HARRIS, *Examiner.*

R. P. SEITTER, *Assistant Examiner.*